(12) United States Patent
Yang (10) Patent No.: US 6,196,781 B1
(45) Date of Patent: Mar. 6, 2001

(54) SCREW FASTENER WITH MULTIPLE THREADED PORTIONS

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 09/440,269

(22) Filed: Nov. 15, 1999

(51) Int. Cl.[7] .............................. F16B 35/02; F16B 37/08
(52) U.S. Cl. ...................... 411/384; 411/389; 411/397; 411/432; 411/916; 411/917
(58) Field of Search ................. 411/5, 6, 8, 383, 411/384, 389, 397, 432, 917, 916

(56) References Cited

U.S. PATENT DOCUMENTS

| | | | |
|---|---|---|---|
| 2,571,265 | * 10/1951 | Leutven | 411/917 X |
| 3,408,887 | * 11/1968 | Villo | 411/389 |
| 3,419,298 | * 12/1968 | Worley | 411/384 X |
| 4,240,670 | * 12/1980 | Zorn et al. | 411/432 X |
| 4,840,529 | * 6/1989 | Phillips | 411/384 X |
| 5,253,967 | * 10/1993 | Organ et al. | 411/432 |
| 5,358,367 | * 10/1994 | Yang | 411/397 |

\* cited by examiner

*Primary Examiner*—Neill Wilson
(74) *Attorney, Agent, or Firm*—Bacon & Thomas, PLLC (57) ABSTRACT

A screw fastener with a second, additional external thread section apart from the main, external or internal, thread section in a typical bolt or nut, respectively. The axes of the two threaded sections in the nut or bolt are arranged parallel, eccentric, or angled relative to each other and the direction in which the thread travels for any threaded section may be the same, or different from the thread in the other section. A cap may also be formed on top of the externally threaded structure.

9 Claims, 12 Drawing Sheets

SCREW FASTENER WITH MULTIPLE THREADED PORTIONS

BACKGROUND OF THE INVENTION

1. Field of the Invention

The present invention generally relates to a screw fastener, featuring an additional, externally-threaded section that provides compression and/or fine adjustment apart from the typical threads, and, more particularly, that serves to improve the fastener by including multiple threaded portions for providing additional tightening and fine adjustment capabilities.

2. Description of the Related Art

In traditional nut and bolt structures, operations such as binding, compression, fine adjustment, and or measurement are controlled by the pitch of the threads on the nut and bolt. Typically, only one external thread and one internal thread, both with same pitch and direction are provided on these structures, thus limiting their usefulness suitability where compression or fine adjustment is needed.

While some nut and bolt assemblies may have multiple threaded sections, they also suffer from the following drawbacks:

1. Vulnerability to loss in the same manner as the conventional single piece nut and bolt designs;
2. Absence of different thread orientations in each of the threaded sections which may allow loosening during vibration, and resonance frequency vibration in particular; and
3. Absence of consideration with regard to the direction of rotation of the threads which limits the scope of application.

In order to provide features that save labor on the part of the user, and to allow for compression and fine adjustment capabilities so as to expand the scope of applications, a novel composite nut and bolt design is disclosed here.

SUMMARY OF THE INVENTION

The primary object of the invention, therefore, is to provide a novel design for a composite nut and bolt structure featuring an external thread section on the end of a bolt or screw, or the end of a nut, in addition to the usual internal and external thread sections on the nut and bolt, respectively. Two threaded sections are thus formed for both the nut or the bolt in this composite layout so as to provide additional compressioning or fine adjustment capabilities.

DETAILED DESCRIPTION OF THE PREFERRED EMBODIMENTS

Figure 1:
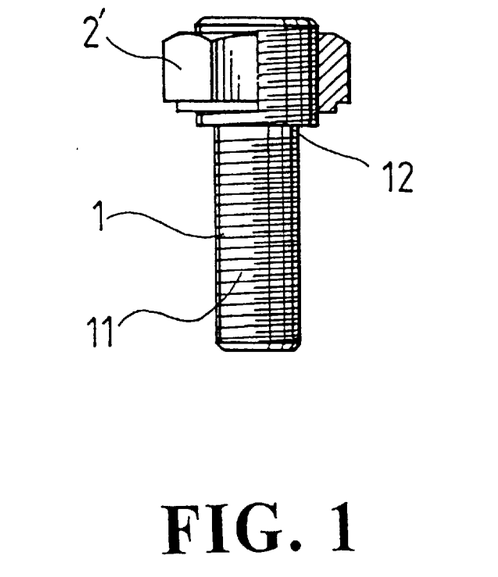
FIG. 1 is an illustration of a screw or bolt with two (external) threaded sections and a peripheral nut arranged on one end.
Figure 2:
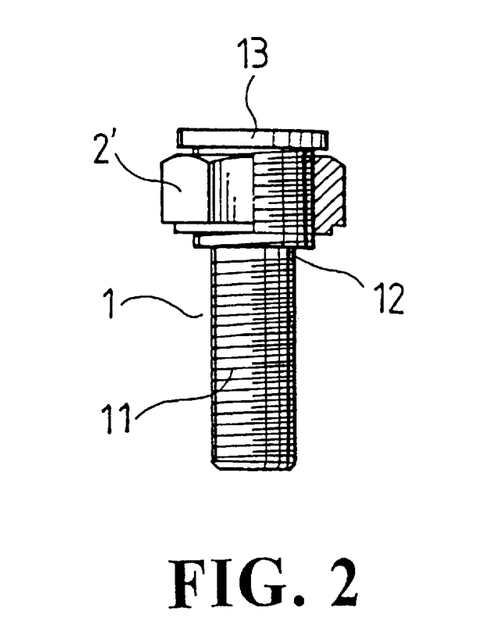
FIG. 2 is an illustration of the invention shown in FIG. 1 with a cap on one end of the perphral nut.

As shown in FIG. 1 and FIG. 2, respectively, the invention includes an additional externally threaded section 12 for engaging a peripheral nut 2' above the main threaded section 11 on the screw, or bolt 1. Alternatively, an additional externally threaded section 22 (see FIG. 3) may be arranged on a nut 2 for engaging the peripheral nut 2' so that the main external thread section 11 on the bolt 1 will engage the internal threads 21 inside the nut 2, or other threaded fastener. The interaction of bolt 1 with the nut 2, and the nut 2 with peripheral nut 2', provides compressioning and fine adjustment effects.

Figure 3:
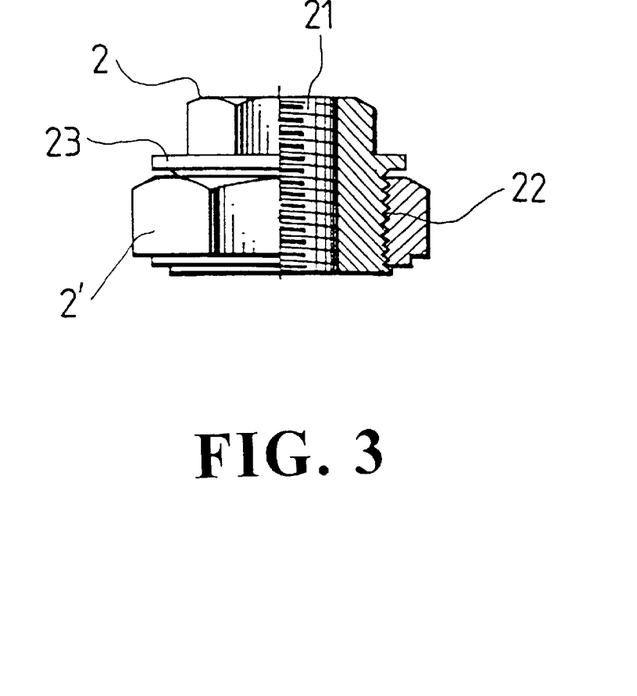
FIG. 3 is an illustration of a nut with two (one internal and one external) threaded sections and with a peripheral nut arranged on one end.
Figure 4:
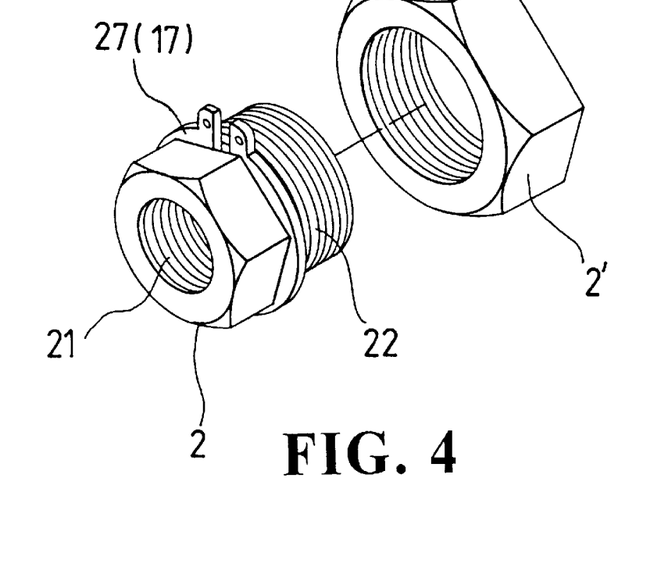
FIG. 4 illustrates the invention of FIG. 3 wherein the cap is replaced with a split-washer ring.
Figure 5:
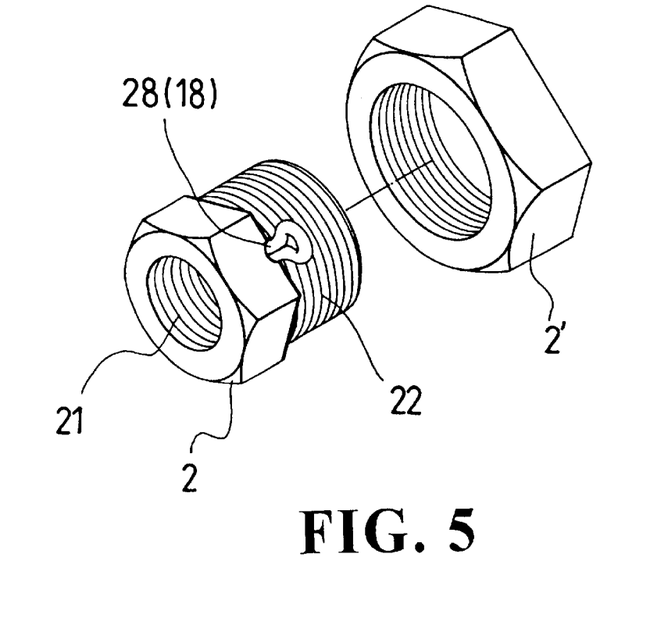
FIG. 5 illustrates the invention of FIG. 3 wherein the cap is replaced with a safeguard pin.

As shown in FIG. 2 and FIG. 3, respectively, a novel feature of the invention lies in the provision of a cap 13, 23 adjacent to the top of an additional thread section 12 on bolt 1 (FIG. 2), or adjacent to the top of the additional external thread section 22 on the nut 2 (FIG. 3), in abut one side of the peripheral nut 2' securely in place. The diameter of the caps 13, 23 is larger than the external thread sections 12 and 22 so as to prevent the peripheral nut 2' from being screwed past the end of the (external) thread sections 12 or 22 of the bolt 1 or nut 2, respectively. The resulting structure will unscrew in any direction other than the one by which it was screwed into place. With reference to FIG. 4 and FIG. 5, it will be appreciated that the cap 13, 23 may be replaced by a washer ring 17, 27 or a safeguard pin 18, 28, while the effects provided by the caps 13, 23 remain unchanged.

Figure 6:
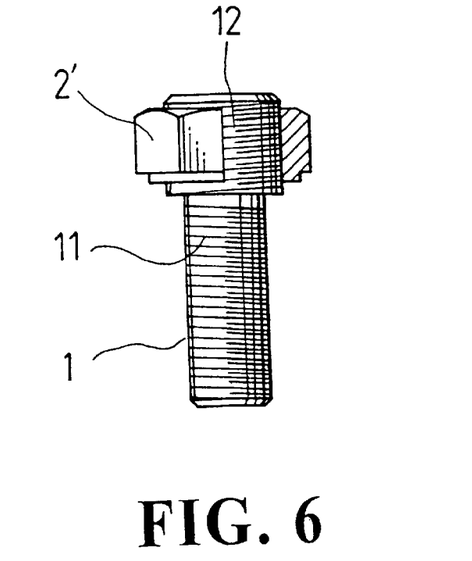
FIG. 6 illustrates the invention of FIG. 1 with the threaded sections running in opposite directions.
Figure 7:
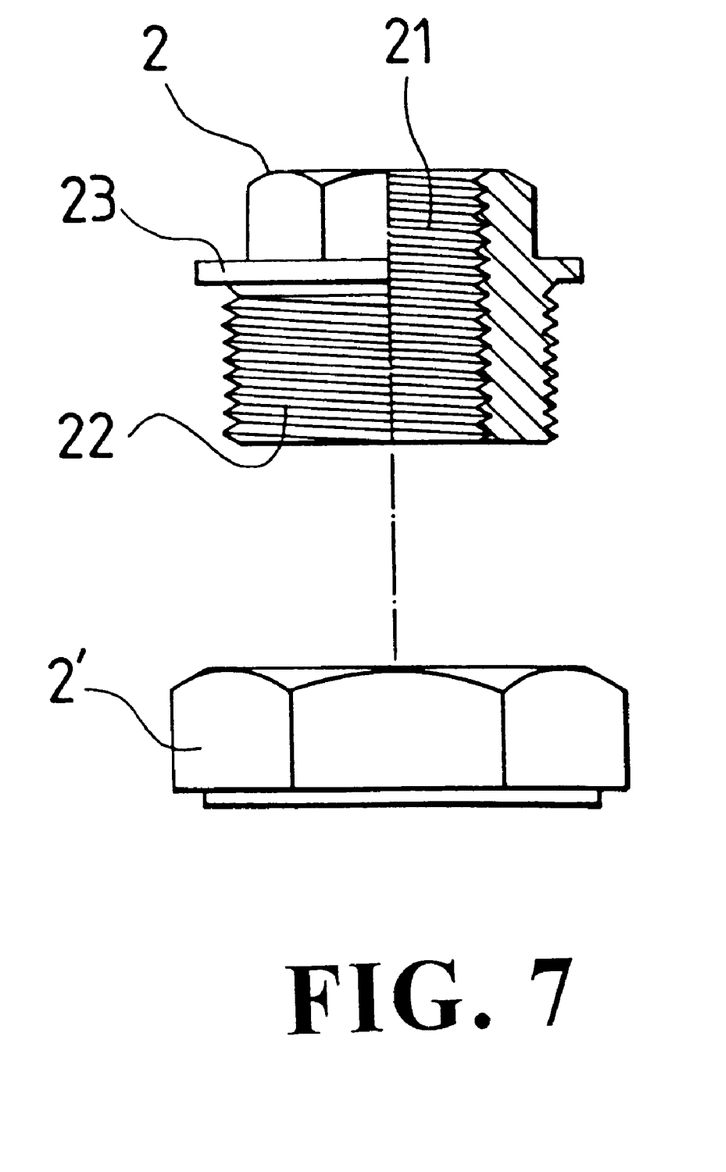
FIG. 7 illustrates the invention FIG. 3 with the threaded sections running in opposite directions.

As further shown in FIG. 6, the first, or main, (externally) threaded section 11 of the bolt 1 can run in a direction different than the additional, or second, (externally) threaded section 12. For example, where one section contains left-handed threads, the other contains right-handed threads, so that once bolt 1 is locked against a workpiece and is secured by the peripheral nut 2', a redoubled compression effect will be achieved with better slack-proofing effect. A similar effect can be appreciated with reference to FIG. 7, where the direction of the first, or main, (internally) threaded section 21 in the nut 2 is different from the direction of the additional, or second, (externally) threaded section 22 on the nut 2. The second threaded section may thus be externally or internally threaded depending upon whether the invention is configured as a bolt 1 or nut 2.

Figure 8:
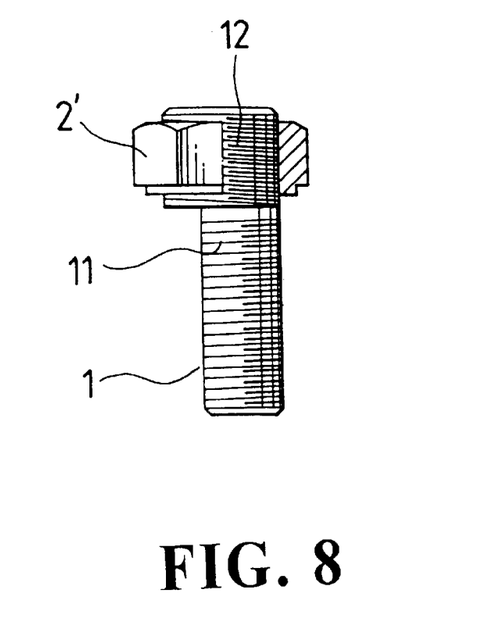
FIG. 8 illustrates he invention of FIGS. 1 or 6 with the axes of the threaded sections being parallel and eccentric.
Figure 9:
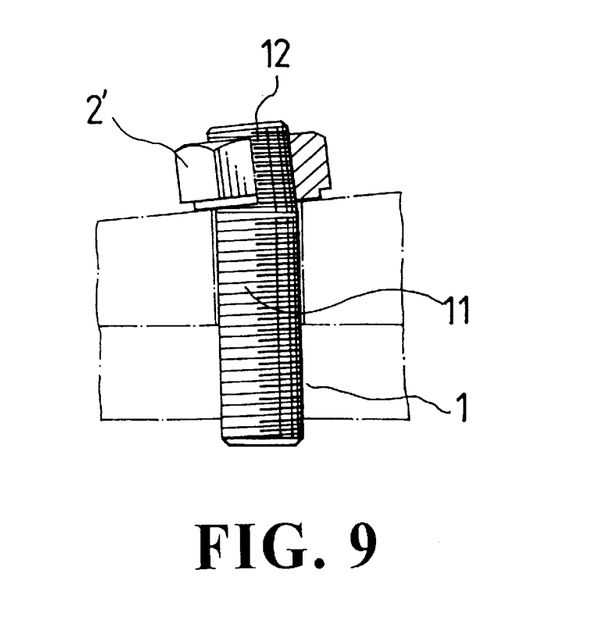
FIG. 9 illustrates the invention of FIGS. 1 or 6 with the axes of the threaded sections being arranged at different angles.

As shown in FIG. 8, the prime (or first, or main) external thread section 11 and the additional (or second) external thread section 12 on bolt I may have parallel axes that are not concentric. Referring to FIG. 9, it is seen that the axes of the main thread section 11 and the additional thread section 12 may also be angled from each. In this latter configuration, once the main thread section 11 is locked onto the flat bottom of the workpiece, then the peripheral nut 2' may be locked onto the angled thread section 12 so that the bottom of the peripheral nut 2' is tightened against the sloped side of the workpiece. Thus, the bolt 1 may be secured to a workpiece with a sloped front without coming loose.

Figure 10:
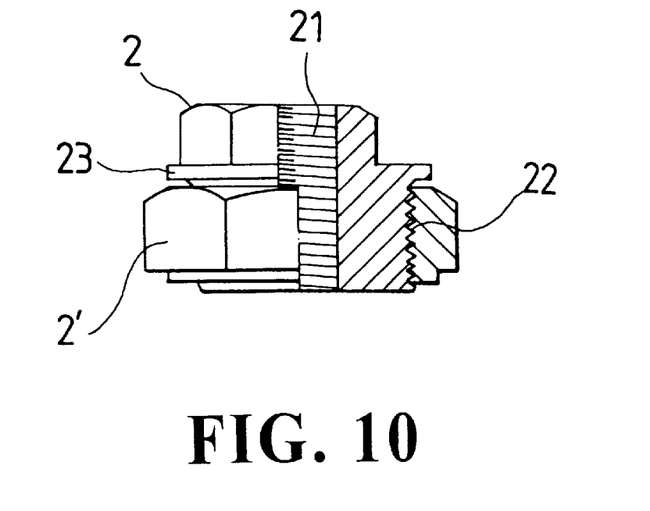
FIG. 10 illustrates the invention of FIGS. 3 or 7 with the axes of the threaded sections being parallel and eccentric.
Figure 11:
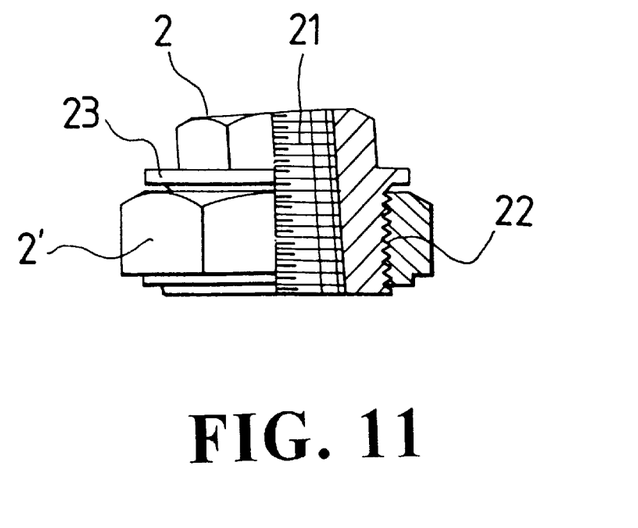
FIG. 11 illustrates the invention of FIGS. 3 or 7 with the axes of the threaded sections being arranged at different angles.
Figure 12:
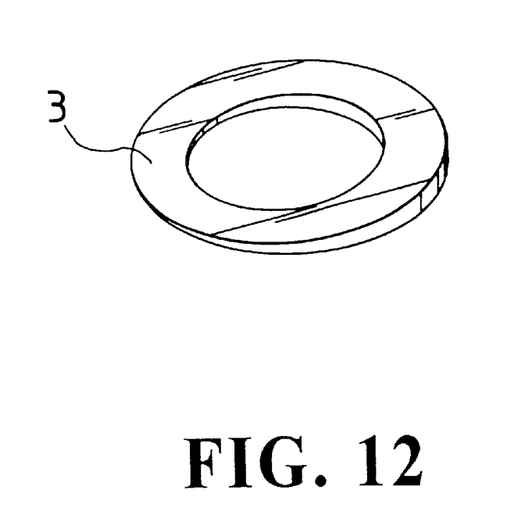
FIG. 12 is an isometric view of a camber washer.
Figure 13:
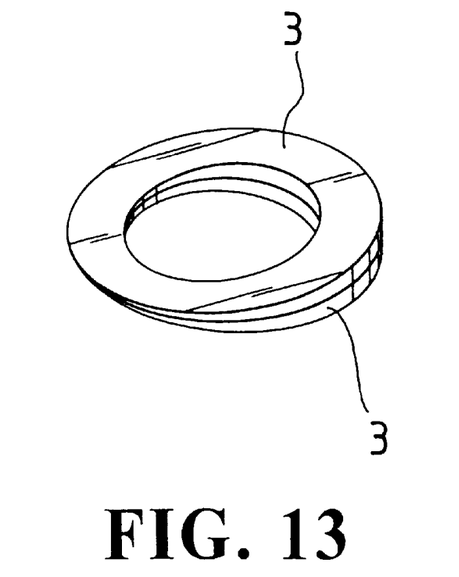
FIG. 13 illustrates two of the camber washers from FIG. 12 arranged in complimentary engagement with each other.

Referring to FIG. 10, it will be seen that the axis of the first (inner) thread section 21 in nut 2 is parallel, but not concentric, with axis of the second (external) thread section 22 in the nut 2. Also, as shown in FIG. 11, the axes of the thread sections 21 and 22 may also be angled relative to each other for use on workpieces with a sloped front. As illustrated in FIG. 12 and FIG. 13, the invention may also incorporate a camber washer 3 to help adapt a bolt 1 and peripheral nut 2' with angled shafts for use on workpieces with different sloped fronts. The camber washer may be also used in pairs or rotated to adapt to various angular settings.

Figure 14:
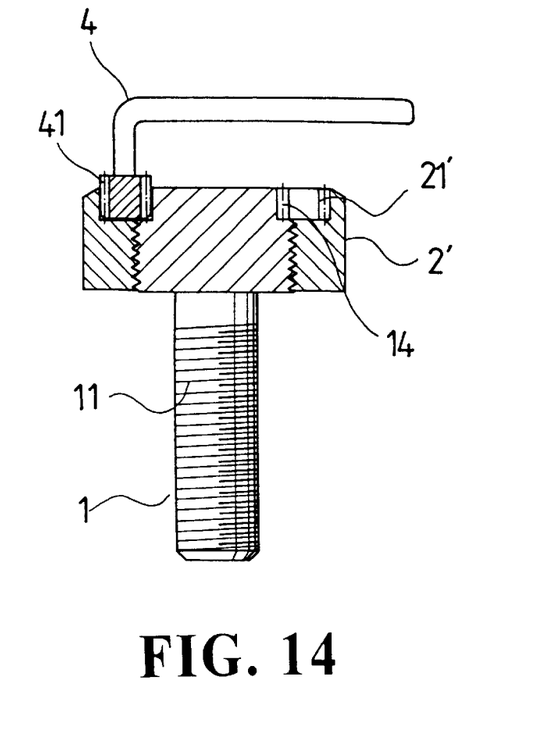
FIG. 14 illustrates the invention of FIGS. 1 or 6 with a gear assembly.
Figure 15:
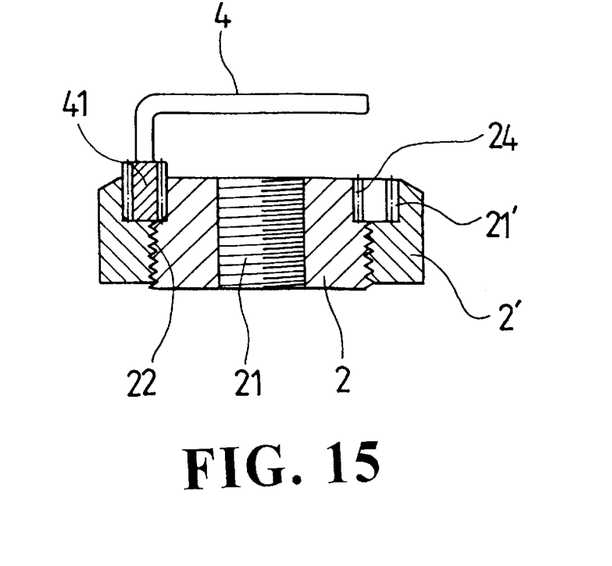
FIG. 15 illustrates the invention of FIGS. 3 or 7 with a gear to assembly and no cap.

Referring to FIG. 14 and FIG. 15, respectively, a pinion space may be provided with teeth arranged 14 or 24, and 21' arranged between the second, external thread section 12 of the bolt 1 and the peripheral nut 2' (FIG. 14), or between the second, external thread section 22 of the nut 2 and the peripheral nut 2' (FIG. 15). When engaged between peripheral nut 2' and bolt 1 (FIG. 14), or between the peripheral nut 2' and nut 2 (FIG. 15), the external thread sections 12 or 22 may be turned relative to the peripheral nut 2' by a handle 4. The handle 4 preferably is the form of an L shape spanner with a pinion 41 provided on one end for inserting into the pinion space 21' and engaging with the teeth 14 or 24, and with the teeth 21' in a manner similar to a planetary gear assembly. It can be seen that the direction in which the main thread section 11 turns will be different from that in which the external thread section 12 turns. Similarly, the inner thread section 21 may run opposite to that in which the peripheral thread section 22 moves.

Figure 16:
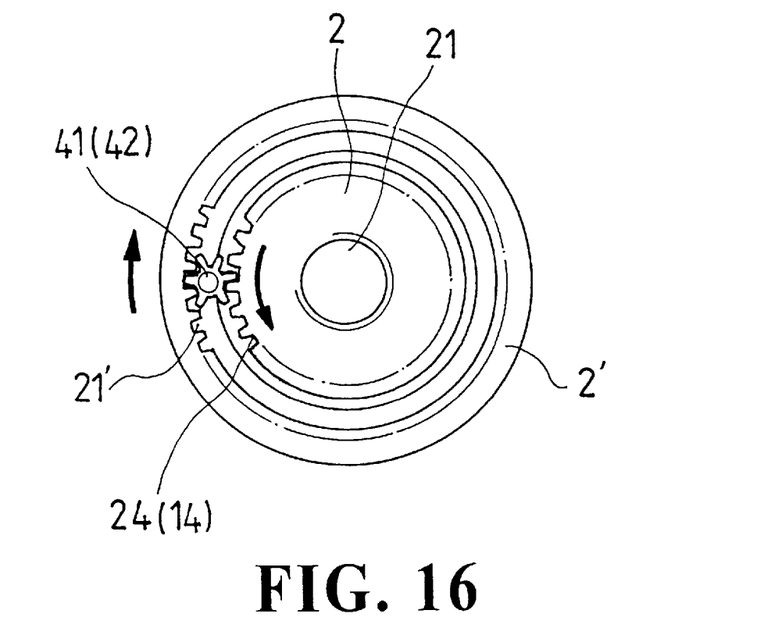
FIG. 16 illustrates a top view of the invention of FIGS. 14 and 15 in operation.
Figure 17:
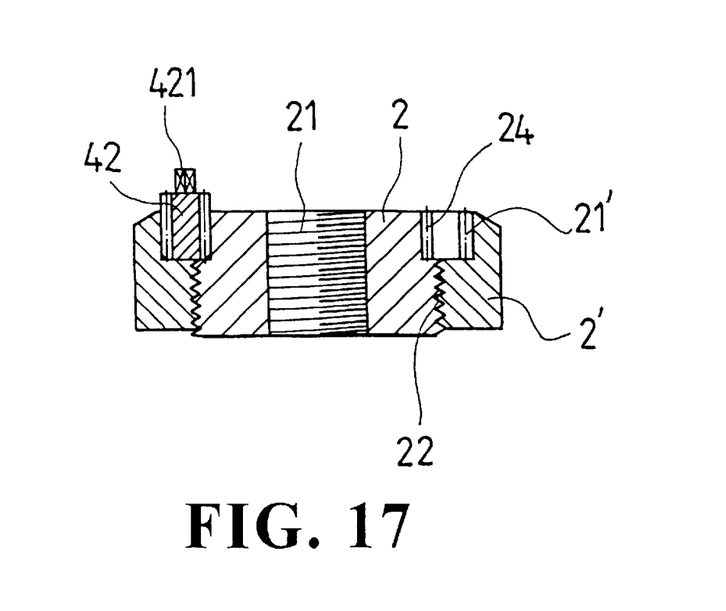
FIG. 17 illustrates another structure for the gear assembly shown in FIG. 15.

As shown in FIG. 16, rotating the spanner 4, will cause the bolt I or nut 2 to turn in a direction counter to that of the peripheral nut 2' in order to facilitate subsequent tightening or loosening. Alternatively, as shown in FIG. 17, it is also feasible to have a pinion 42 or 42 installed, in advance, between gear the 14 or 24 and the gear teeth 21'. A coupling section 421 may then be formed on top of the pinion 42 which is then driven through conventional spanning techniques in order to attain the same effects as described above. The composite bolt or nut structure incorporating the gear set as disclosed thus far will prove to be a truly reliable, secure, and labor-saving when applied to the locking of large scale apparatus.

The several embodiments of the invention may be executed in connection with a bolt 1 or a nut 2 having a two thread sections with concentric, eccentric, and/or angled axes. The structure may also incorporate caps 13, 23. All of these features fall within the scope of the invention for providing compression and fine adjustment in various industrial applications where such effects are needed.

Figure 18:
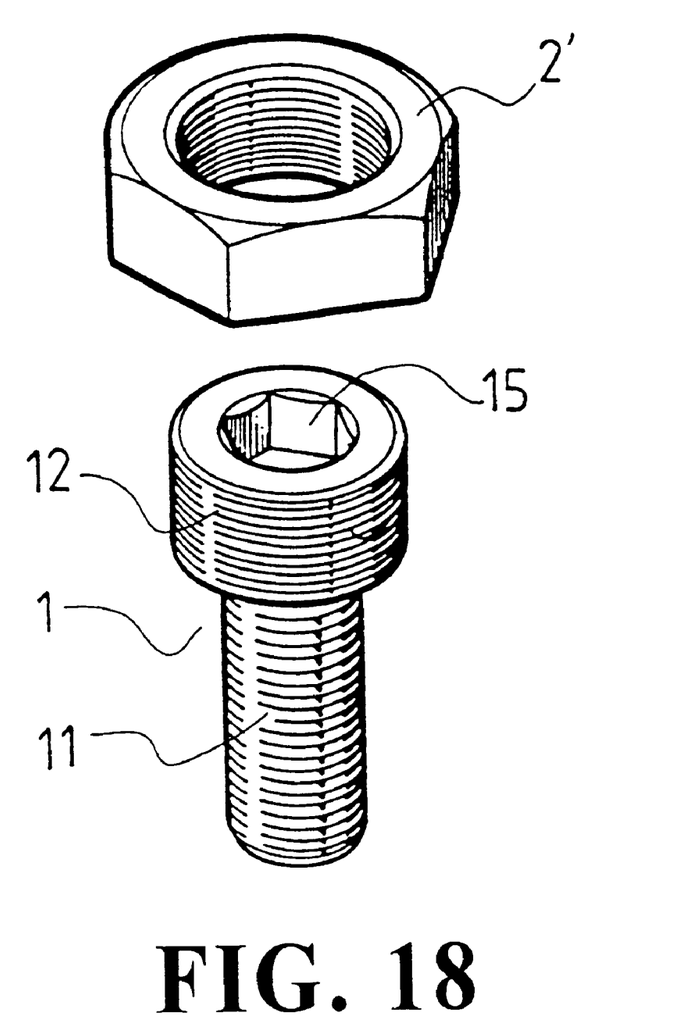
FIG. 18 is an exploded isometric view of the invention in FIGS. 1 or 6 with a polygonal notch formed in the end of the bolt.
Figure 19A:
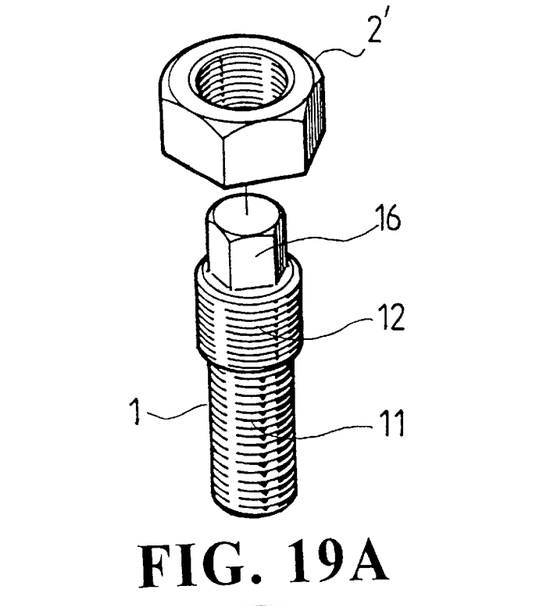
FIG. 19A is an exploded isometric view of the invention in FIG. 18 with a wrench coupling stem.
Figure 19B:
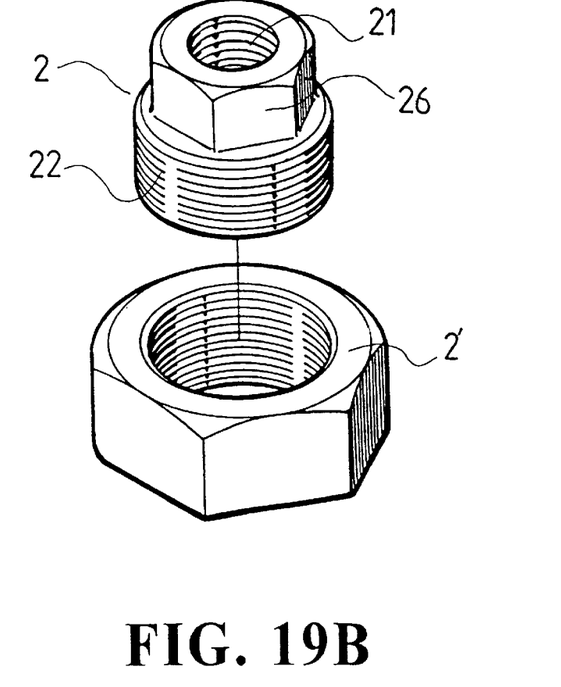
FIG. 19B is an exploded isometric view of the invention in FIGS. 3 or 7 with the cap removed.
Figure 20A:
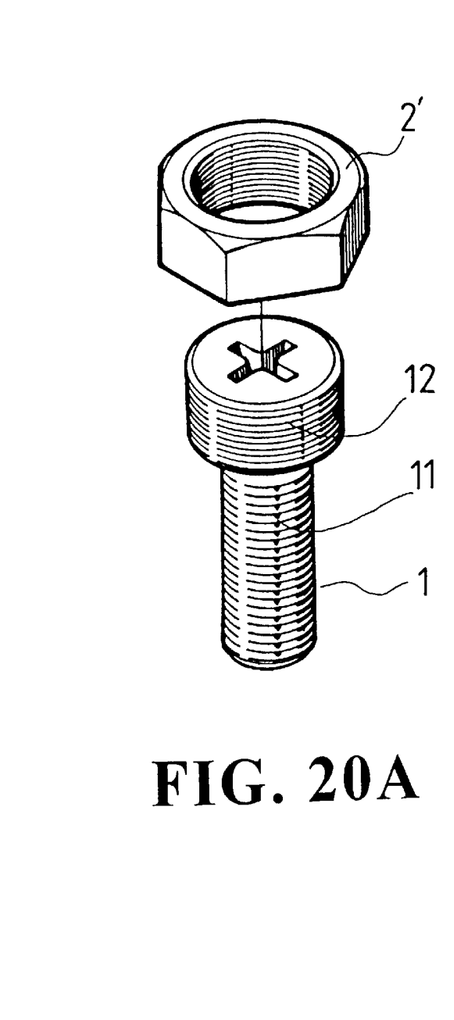
FIG. 20A is an exploded isometric view of the device in FIGS. 1 or 6 with a Philips-head screwdriver fitting at the top of the bolt.
Figure 20B:
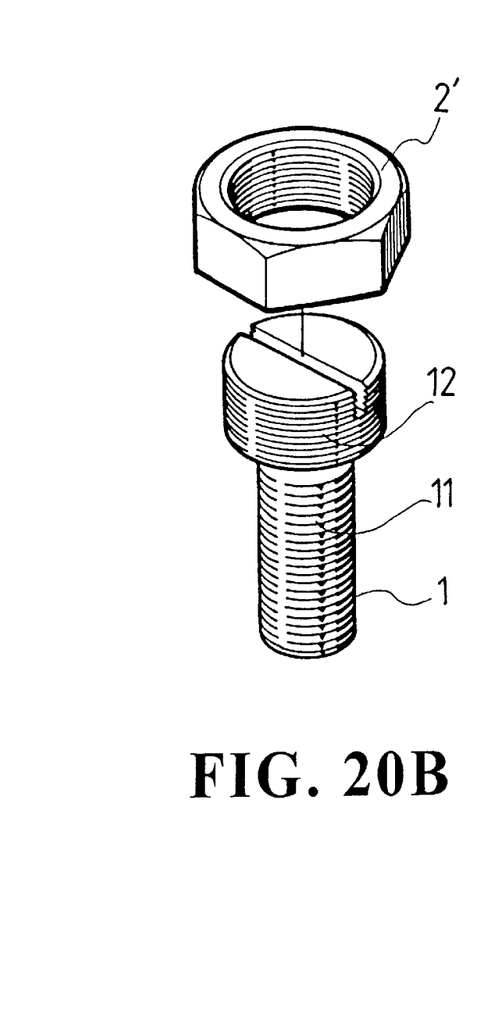
FIG. 20B is an exploded isometric view of the device in FIG. 20A with a straight-blade screwdriver fitting at the top of the bolt.
Figure 20C:
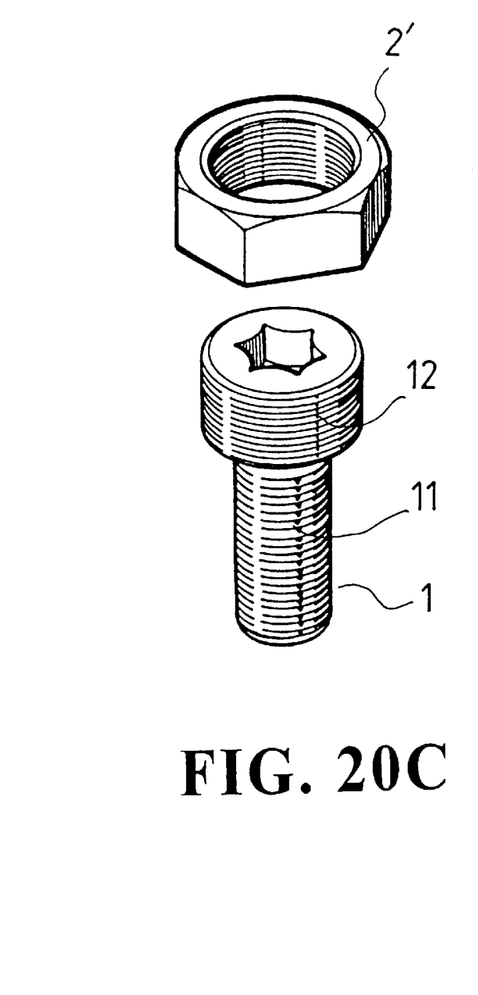
FIG. 20C is an exploded isometric view of the device in FIG. 20A with an star-shaped wrench fitting at the top of the bolt.

As shown in FIG. 18, the coupling means for driving the bolt 1 may set in a polygonal notch 15, or Allen-head wrench fitting, that is centrally positioned on top of the external thread section 12. The notch 15 is then driven by a manual tool. As illustrated in FIG. 19A and FIG. 19B, an alternative embodiment includes a polygonal, wrench coupling stem 16, 26 on top of the external thread section 12, 22 of either the bolt 1 or nut 2. As shown in FIG. 20A, the top end of the external thread section 12 may also be formed into a cross-head groove pattern for receiving a Philips-head srewdriver. As shown in FIG. 20B, a straight screwdriver fitting may also be used. In yet another embodiment shown in FIG. 20C, the bolt 1 may be driven by a star-shaped groove. In short, all means capable of driving the composite bolt 1 or nut 2 are to be considered to be withing the scope of this disclosure.

In summation, it is respectfully submitted that this disclosure is sufficient to draw the conclusion that the claimed composite nut and/or bolt structure, by reason of its utility, novel features, and worthwhile effects consistent with its design objectives is a remarkable invention indeed.

What is claimed is:

1. A screw fastener with multiple threaded portions, comprising:

a main body having a first threaded portion with a first diameter and a second, externally-threaded portion with a second diameter that is larger than the first diameter;

a peripheral nut having an internal thread for engaging the threads on the second portion of the main body;

a peripheral flange extending from the main body at one end of the second threaded portion for abutting one side of the peripheral nut when it is engaged with the external thread; and wherein said first and second threads run in opposite directions.

2. The screw fastener recited in claim 1 wherein the main body is selected from the group consisting of a main bolt having an external first threaded portion and a main nut having an internal first threaded thread portion.

3. The screw fastener recited in claim 2 wherein an axis of the first thread is parallel with an axis of the second thread.

4. The screw fastener recited in claim 3 wherein an axis of the first thread is co-linear with an the axis of the second thread.

5. The screw fastener recited in claim 2 wherein an axis of the first thread intersects an axis of the second thread.

6. The screw fastener recited in claim 5, further comprising at least one camber washer arranged under the peripheral nut.

7. The screw fastener recited in claim 1, further comprising a pinion space arranged between the main body and the peripheral nut.

8. The screw fastener recited in claim 7 further comprising a pinion arranged in the pinion space for driving the main body and the peripheral nut in opposite directions.

9. The screw fastener recited in claim 8 wherein the main body is selected from the group consisting of a main bolt having an external first threaded portion and a main nut having an internal first threaded thread portion.

\* \* \* \* \*